No. 797,796. PATENTED AUG. 22, 1905.
E. DEVLIN.
HOSE OR PIPE COUPLING.
APPLICATION FILED JAN. 24, 1905.
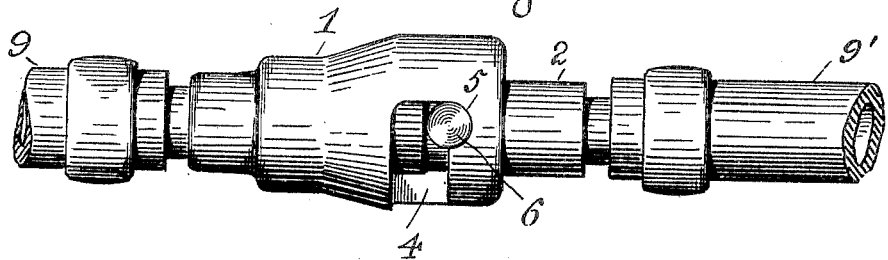
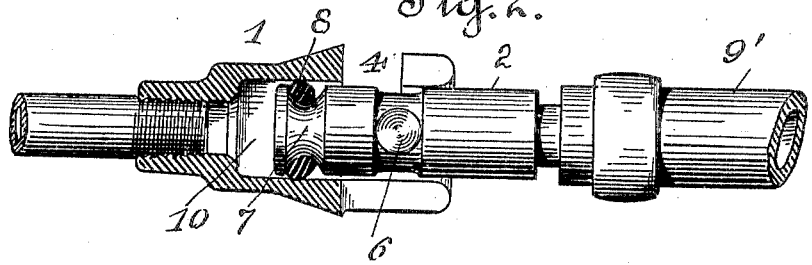
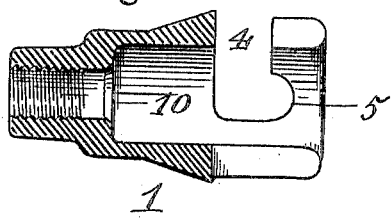
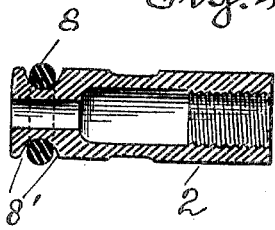
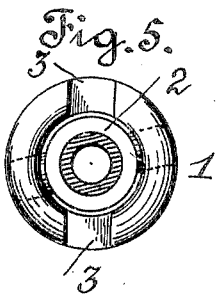
Witnesses.
Inventor.
Edward Devlin,
by N. A. Acker
his atty

UNITED STATES PATENT OFFICE.

EDWARD DEVLIN, OF SAN FRANCISCO, CALIFORNIA, ASSIGNOR TO JOHN T. SCOTT, OF SAN FRANCISCO, CALIFORNIA.

HOSE OR PIPE COUPLING.

No. 797,796.     Specification of Letters Patent.     Patented Aug. 22, 1905.

Application filed January 24, 1905. Serial No. 242,460.

*To all whom it may concern:*

Be it known that I, EDWARD DEVLIN, a citizen of the United States, residing in the city and county of San Francisco, State of California, have invented certain new and useful Improvements in Hose or Pipe Couplings; and I do hereby declare the following to be a full, clear, and exact description of the same.

The present invention relates more particularly to a coupling designed for the connecting of the ends of the air-hose connections for trains or the hose connections which conduct the air from the train's engine to the automatically-operated air-brakes, although the invention is equally as well adapted for the coupling of steam and water hose generally, the object of the invention being the production of a coupling which while being simple, durable, and easily connected and disconnected shall positively provide against leakage, the packing or elastic packing-ring being so fitted that the greater the pressure thereon the firmer will be its seat within the locking member of the coupling.

To comprehend the invention, reference should be had to the accompanying sheet of drawings, wherein—

Figure 1 is a side view illustrating the coupling connected and the air-hose secured to the respective members. Fig. 2 is a similar view, the locking member of the coupling being sectioned longitudinally. Fig. 3 is a detail longitudinally-sectional view of the locking member of the coupling. Fig. 4 is a similar view of the interlocking member of the coupling, and Fig. 5 is a front view in elevation of the lock member of the coupling.

The coupling comprises a lock member 1 and an interlocking member 2. In the outer end portion of the former are made the entrance-slots 3. These slots communicate with the vertical slots 4, the two forming bayonet-slots in the locking member 1 of the coupling. The slots 4 are formed with a return portion 5, which return portions are arranged parallel to the entrance-slots 3.

The interlocking member 2 is provided with the projecting studs 6, which studs as the members are brought together for the purpose of coupling slip into the entrance-slots 3.

Near the extremity of the interlocking member 2, in advance of the studs 6, is formed a peripheral groove 7, within which is fitted an elastic or rubber washer 8. This peripheral groove or washer-seat 7 is provided with the inclined or beveled inner walls 8' 8', upon which the packing ring or washer 8 may ride upon pressure being exerted thereon, which packing ring or washer as it rides on the inclined faces 8' 8', depending on which way the pressure bears, is expanded and forced firmly against the inner wall of the lock member 1 of the coupling, and thus prevents leakage between the joint of the coupling.

It will be understood that the sections or ends 9 9' of the air, steam, or water hose are united, respectively, to the members 1 2 of the coupling, Fig. 1 of the drawings.

To couple the members for the connecting of the ends of the air, steam, or water hose, the inner end of the interlocking member 2 is inserted within or introduced into the socket 10 of the member 1 and the said member 2 forced inward until the projecting studs 6, which enter the opposing slots 3, are in line with the vertical slots 4, which constitute an angular extension of the entrance-slots 3. The interlocking member 2 is then turned on its axis so that the studs 6 move into the vertical slots 4 to their top. Then the member 2 is pulled forward to slip the studs 6 into the return portion 5 of the vertical slots 4, whereby the parts are locked against lineal separating pressure.

As the packing ring or washer 8 is forced to ride upon either of the inclined or beveled faces of the peripheral groove 7 by the pressure of the air, steam, or water passing through the coupling, the same is expanded and forced firmly against the wall of the socket 10, thereby forming a tight joint between the members and preventing leakage.

A reverse movement being given to the member 2 over that just described in the locking or coupling of the members destroys the union between the parts and permits of the member 2 being quickly separated from its lock member 1.

The ease and quickness with which the parts may be connected and disconnected over the use of the screw or the clamp coupling will readily recommend the described coupling for use in connection with train equipment.

Having thus described the invention, what is claimed as new, and desired to be protected by Letters Patent, is—

A coupling for air, steam or water hose, the same comprising a lock and an interlocking member, a socket in the lock member for the reception of the inner end of the interlocking member, two bayonet-slots formed in the lock member, projecting studs on the interlocking member which work within the bayonet-slots when the interlocking member has been forced into and turned within the locking member, the locking member having a straight bearing portion, and said interlocking member having a peripheral groove near its inner end with oppositely-disposed inclined or beveled walls, and an elastic washer or ring movably seated within said peripheral groove, and adapted to be forced by the respectively inclined walls of the groove into wedging engagement with said straight bearing upon longitudinal movement of the interlocking member in either direction.

In testimony whereof I have hereunto affixed my signature in the presence of witnesses.

EDWARD DEVLIN.

In presence of—
 FREDERICK BIRDSALL,
 EDWIN V. KRICK.